United States Patent
Tappe et al.

(10) Patent No.: US 8,662,444 B2
(45) Date of Patent: Mar. 4, 2014

(54) MONUMENT FOR A CABIN OF A VEHICLE

(75) Inventors: Jürgen Tappe, Hamburg (DE); Christian Holst, Hamburg (DE); Ralph Sturm, Schenefeld (DE); Gregor Behlau, Hamburg, DE (US); Michael Waller, Hamburg (DE); Frank Trautmann, Vierden (DE); Arne Terstal, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 19 days.

(21) Appl. No.: 13/355,976

(22) Filed: Jan. 23, 2012

(65) Prior Publication Data

US 2012/0119029 A1    May 17, 2012

Related U.S. Application Data (63) Continuation of application No. PCT/EP2010/060635, filed on Jul. 22, 2010.

(60) Provisional application No. 61/228,037, filed on Jul. 23, 2009.

(30) Foreign Application Priority Data

Jul. 23, 2009    (DE) .................. 10 2009 034 406

(51) Int. Cl.
  *B64D 11/00*    (2006.01)
(52) U.S. Cl.
  USPC ................... 244/118.5; 244/117 R (58) Field of Classification Search
  USPC ........ 244/118.5, 117 R, 118.1; 132/286, 287, 132/75; 296/156, 164, 24.3
  See application file for complete search history.

(56) References Cited

U.S. PATENT DOCUMENTS

| | | | |
|---|---|---|---|
| 2,650,368 A * | 9/1953 | Evans | 52/34 |
| 4,589,463 A | 5/1986 | Ryan | |
| 5,658,031 A * | 8/1997 | DiBiagio et al. | 296/26.01 |
| 6,007,025 A | 12/1999 | Coughren et al. | |

(Continued)

FOREIGN PATENT DOCUMENTS

| | | |
|---|---|---|
| EP | 0850833 A2 | 7/1998 |
| EP | 0867365 A2 | 9/1998 |

(Continued)

OTHER PUBLICATIONS

International Search Report dated Nov. 12, 2010 for International Application No. PCT/EP2010/060635.

(Continued)

*Primary Examiner* — Philip J Bonzell
*Assistant Examiner* — Timothy Schwarz
(74) *Attorney, Agent, or Firm* — Ingrassia Fisher & Lorenz, P.C.

(57) ABSTRACT

An area-expandable monument is provided for a cabin of a vehicle that includes, but is not limited to two housing parts that are displaceable relative to each other and can be fastened. A gap between the housing parts in an expanded state can be covered by a covering element. In the monument, a first sanitary fixture could be arranged whose position adapts to the spatial state of the monument. Optionally, there is also a pivotable second sanitary fixture that can be activated with the monument in its pushed-out state.

19 Claims, 7 Drawing Sheets

(56) References Cited

U.S. PATENT DOCUMENTS

| | | |
|---|---|---|
| 6,079,669 A | 6/2000 | Hanay et al. |
| 6,604,709 B1 | 8/2003 | Wentland et al. |
| 6,615,421 B2 | 9/2003 | Itakura |
| 6,889,936 B1 | 5/2005 | Pho et al. |
| 7,117,646 B2 * | 10/2006 | Blaisdell et al. ............... 52/79.5 |
| 7,980,511 B2 * | 7/2011 | Janboecke et al. ......... 244/118.5 |
| 2005/0116099 A1 | 6/2005 | Pho et al. |

FOREIGN PATENT DOCUMENTS

| | | |
|---|---|---|
| EP | 1209078 A2 | 5/2002 |
| EP | 1338508 A2 | 8/2003 |
| JP | 2006040399 A | 2/2006 |

OTHER PUBLICATIONS

German Office Action dated Dec. 1, 2010 for German Application No. 102009034406.3.

* cited by examiner

MONUMENT FOR A CABIN OF A VEHICLE

CROSS-REFERENCE TO RELATED APPLICATIONS

This application is a continuation of International Application No. PCT/EP2010/060635, filed Jul. 22, 2010, which was published under PCT Article 21(2) and which claims priority to German Patent Application No. 102009034406.3 filed Jul. 23, 2009, and claims priority to U.S. Provisional Patent Application No. 61/228,037 filed Jul. 23, 2009, the disclosures of which applications are hereby incorporated herein by reference.

TECHNICAL FIELD

The technical field relates to a monument for a cabin of a vehicle, to the use of a monument in a passenger cabin of a vehicle, and to a vehicle with a passenger cabin, at least one passenger cabin exit, and at least one monument.

BACKGROUND

Passenger cabins of modern vehicles are not only devices for accommodating passengers provided in them, but also devices that make it pleasant for passengers to be on board the vehicle. Thus, in passenger cabins, for example of commercial aircraft, various larger installations are usually provided, which are also known by the term "monuments" and which can perform a multitude of different tasks. A monument could, for example, accommodate a lavatory with sanitary items, with passengers being able to enter said lavatory and to lock it from within.

Due to the normally limited available space in vehicles, monuments comprise a strongly integrated design, and thus in the smallest space the greatest-possible concentration of items of equipment, for example sanitary fixtures, waste containers, paper towel dispensers, mirrors, illuminating devices and the like. Due to the severe spatial restrictions, enlargeable monuments are also known from the state of the art. These enlargeable monuments comprise a variable housing design and which, for example, in a stowed-away position extend only over a very small floor area of a cabin floor, while in an operating position they extend over a relatively large floor area that extends up to a region in front of a passenger cabin door.

At present, enlargeable monuments in the form of shower cabins, toilets and the like are known, in which only as a result of the procedure of enlargement can the actual functions be used. For example, EP 850833 B1 discloses a monument that in an enlarged, expanded, state makes a toilet and additional storage space useable. In this monument, the storage space is useable in any state of the monument. However, the intended use as a toilet is only available in an enlarged state of the horizontal projection.

U.S. Pat. No. 4,589,463 shows a monument with an enlargeable horizontal projection, which monument can be used only in particular states of the vehicle. To use this monument in security-relevant zones of a vehicle has to be refrained. Furthermore, U.S. Pat. No. 6,889,936 discloses a sanitary installation that achieves enlargement of the horizontal projection in that a sanitary installation unit is pivotally mounted and can be pivoted from a stowed position to a position that enlarges the horizontal projection. In this arrangement, while in principle it is possible to enter the monument, the use of the sanitary installation is, however, not possible in the stowed position.

It could be considered disadvantageous to be able to use an enlargeable monument in a vehicle only within different operational phases of a vehicle. Correspondingly, it could be considered at least one object to propose a monument for a cabin of a vehicle whose horizontal projection is enlargeable so that the area of the passenger cabin in the vehicle can be optimally used. At least a further object is to providing, in an enlargeable monument, all the basic functions both with the reduced horizontal projection and with the enlarged horizontal projection. In addition, other objects, desirable features and characteristics will become apparent from the subsequent summary and detailed description, and the appended claims, taken in conjunction with the accompanying drawings and this background.

SUMMARY

According to a first embodiment, the monument comprises a first housing part with a floor side and a connection side, a second housing part with a floor side and a connection side, as well as at least one first covering element. The first housing part is equipped for attachment by its floor side to a floor of the cabin. For sliding one of the housing parts into the other housing part, an outer cross-section of the connection side of one of the housing parts is dimensioned to be smaller than an opening cross-section of the connection side of the other housing part. The first housing part and the second housing part thus form a housing that delimits the monument towards the outside. The first housing part and/or the second housing part comprise/comprises locking means for fastening the second housing part in a first relative position and in a second relative position to the first housing part. The first covering element is used to cover a gap between the connection side of the first housing part and of the second housing part in the second relative position.

In other words, the monument comprises two partial monuments, each of them being realized by a housing part. A first housing part is installed to be fixed on the floor of the passenger cabin of the vehicle. On an open side, the second partial monument in the form of the second housing part can be arranged. The opening of the first housing part is correspondingly to be designed in such a manner that the second housing part is slidable into the opening of the first housing part. On the other hand, conversely, it is also possible for the opening cross-section of the second housing part to be designed in such a manner that the second housing part can be slid over the first housing part. These two housing parts form the entire monument. The second housing part for the purpose of adjustment, i.e. for enlargement or for size reduction, of the covered floor area can be slid relative to the floor. During sliding of the second housing part from a first relative position to a second relative position, at least on an outside of the housing a gap arises that is to be covered.

As a particular measure, the monument comprises a first covering element of any desired design, which covering element makes it possible for the first covering means to cover the gap between the first housing part and the second housing part. Any solid materials, for example plastics, fiber-reinforced plastics or other composite materials, sandwich panels and the like are imaginable. On the other hand, flexible materials by way of corresponding expansion, rolling off, unwinding or the like, would be suitable to be drawn over the gap in order to completely close off the housing. In addition, it would also be possible to provide a second covering element that supplements the first covering element. The second covering element could, for example, be arranged on the first covering element to be able to fold, to unroll, or to extend, or it could be arranged on one of the housing parts.

The monument could be arranged in a region of the passenger cabin of the vehicle, in direct proximity of which a passenger cabin door is arranged. In a pushed-together state, i.e., when taking up the first relative position, the extension of the monument invention ends beside the passenger cabin door, which in this state can be fully used. If in an operational phase of the vehicle it is provided for the passenger cabin door to be kept closed, for example in flight in an aircraft, the monument can be pushed apart. The second housing part then assumes the second relative position. The extension of the entire housing of the monument then ends, for example, in a region that at least to some extent covers the passenger cabin door. This is permissible as a result of non-intended use of the passenger cabin door, and consequently the space in front of the passenger cabin door, which space is only used during boarding and disembarking and which is often relatively generously dimensioned, during the operational phase of the vehicle can at least to some extent be made available for some other use. This in turn improves the comfort within the monument and at the same time eliminates the necessity of removing other installations from the passenger cabin of the vehicle for accommodating a permanently larger monument.

For entering the monument, an access opening is provided which is preferably arranged to be parallel to an axis of extension of the monument. The term "axis of extension" refers to the axis in which the relative movement of the two housing parts to each other takes place. The access opening, which is arranged parallel to this axis of extension, allows movement extending to be perpendicular to the direction of extension towards the floor of the passenger cabin into the monument. Such an opening can be used both in the case of reduced horizontal projection with the second housing part in the first relative position, and in the case of enlarged horizontal projection with the second housing part in the first relative position. The first housing part and the second housing part are in each case designed in such a manner that the access opening remains completely free in each of the two relative positions. This could mean that the second housing part comprises a cutout which in the first relative position with the pushed-together monument is aligned with an access opening which is arranged in the first housing part or vice versa. With the monument extended, with the second housing part in the second relative position the gap between the two housing parts is formed by this cutout, which then needs to be covered up by the first covering element.

The direction of extension of the monument is advantageously aligned to be parallel to a wall of the cabin so that a direct view to an open access opening or onto a person walking through the access opening is not possible from seats arranged in front of or behind the monument.

In an embodiment of the monument, the second housing part is movably mounted on a guidance device relative to the first housing part. Any guidance devices can be considered that allow easy sliding of the second housing part so that the second housing part can easily be displaced by a single person. Guidance and storage of the second housing part could be ensured by a guidance device situated on the cabin floor, or by a guidance device arranged between the first housing part and the second housing part in the manner of a drawer slide.

In an advantageous embodiment of the monument, the locking means is equipped, as required, to rigidly interconnect the first housing part and the second housing part. To this effect, by means of corresponding actuating devices, the two housing parts by their tops and/or bottoms and/or lateral surfaces are interconnected by way of corresponding mechanisms that are known in the state of the art in such a manner that they can no longer be moved relative to each other. If a guidance device is provided for guiding the second housing part between the first housing part and the second housing part, stopping the second housing part can also be achieved by clamping or blocking the guidance device.

As an alternative or in addition to this, in an advantageous embodiment of the monument, as required, the second housing part could be connected with the cabin floor and/or with a cabin ceiling so that fastening the second housing part can take place independently of the first housing part.

In an embodiment of the monument for fastening the second housing part in all spatial directions, the locking means comprises at least one actuating device. The latter could, for example, be used to insert at least one latch body into at least one corresponding latch body retainer in the cabin floor and/or in the cabin ceiling and/or in the first housing part. In this arrangement, the latch body could be moved across the direction of extension of the monument or to the direction of displacement of the second housing part into the latch body retainer concerned. This makes for particularly easy fastening ability of the second housing part relative to the first housing part arranged in a fixed manner to the previously mentioned. Preferably, the latch body is locked when it has reached its end position.

In an embodiment of the monument, this actuating device is a displaceable, pivotable, pushable or pullable handgrip, which by way of suitable connecting means moves the latch body concerned. For example, a pivotable handgrip is imaginable, which is arranged, centrally and within easy reach of an operator, on a lateral surface of the second housing part, and by way of a linear elastic or rigid means of locomotion, for example a type of Bowden cable or a rod, moves a latch body.

In an embodiment of the monument, the covering element is a wall element that is movably arranged on the first housing part or on the second housing part. In a pushed-together monument, this wall element could be arranged with the second housing part in the first relative position on a lateral surface of the monument so that in this position an access opening of the monument according to the invention is not impeded. In a pushed-apart state with the second housing part in the second relative position, this wall element can be folded, deflected or pivoted to the gap, where it can be fastened.

In an advantageous embodiment of the monument, the housing comprises a flexible floor that extends between the first housing part and the second housing part. The first housing part and/or the second housing part can furthermore comprise receiving means for stowing and releasing an excess floor length, i.e. part of the flexible floor. If the floor of the monument were inflexible and dimensioned in such a manner that it would fully fill a pushed-apart monument with the second housing part in the second relative position, during pushing-together the monument, the floor would interfere or prevent pushing-together. If the floor were inflexible and dimensioned in such a manner that it would fully fill the monument in the pushed-together state, in the case of the monument being pushed apart, said floor would be too short. With a flexible design, by means of different receiving means a situation can be achieved where during pushing together the monument any excess floor length is taken up. This should preferably be implemented in such a manner that the excess floor length in the pushed-together state of the monument according to the invention is not visible but instead disappears, for example, behind various installations.

In an embodiment of the monument, the flexible floor comprises at least one rigid section and at least one lamellar section. Thus in a mechanically simple manner a sturdy floor is created whose lamellar section can, when required, be received by receiving means. This can be implemented in the manner of a drawer slide or in the manner of a louver cupboard with a slidable louver for releasing or closing a cupboard opening.

In a likewise embodiment, the floor comprises a flexible floor covering which by way of an edge finish of the floor forms a floor tray. It can thus be ensured that any soiling or liquid spills occurring in the monument is/are prevented from reaching the outside.

In an embodiment of the monument, it would be favorable to guide the excess floor length, by way of receiving means designed as guidance means, in vertical direction to an edge region of the first housing part and/or of the second housing part. The one or several guidance means could extend behind installations so that the received excess part of the floor is no longer visible from the pushed-together monument. Such installations could be implemented as storage compartments, storage cabinets, covering panels, sanitary fixtures or the like. Particularly preferably, the part of the floor to be received is guided underneath the installations in vertical direction on a wall of the first and/or of the second housing part. The excess part of the floor is thus hidden to the user of the monument, while the remaining part of the flexible floor permits conventional further use. This eliminates the need to create a floor covering that is cut to fit a state of the monument, which floor covering either projects from the housing in the case of the monument being pushed-together, or is too short in the case of the monument being pushed apart, and consequently the floor covering of the cabin in the region beside the cabin door is potentially exposed to additional soiling. Apart from guidance means, it would also be possible to use drum-like or roller-like devices for rolling up the floor covering.

In an embodiment of the monument, a first item of equipment is movably arranged in the housing and can be fastened in a first operating position and in a second operating position. This could, for example, be a first sanitary fixture, for example a toilet bowl or the like, which when the monument is pushed together is arranged in a first operating position, while when the monument is pushed apart is fastened in a second operating position. Thus, it is possible to provide the best-possible comfort to a user using the first sanitary fixture. This possibility of displacing the first item of equipment can be transferred to other items of equipment; it is not limited to sanitary fixtures.

It should be noted that apart from successive manual implementation, the displacement, and optionally also the fastening, of the first item of equipment and the fastening and releasing of the second item of equipment can also be coupled with the displacement of the second housing part. Thus, the first item of equipment automatically reaches its operating position when the monument is enlarged.

In a further embodiment of the monument, the monument is designed as an on-board toilet monument. Such on-board toilet monuments in the vehicle are frequented by a large number of passengers consecutively, and consequently the perception of comfort of all the passengers in the passenger cabin can be significantly improved by the monument that provides more space.

A preferred monument comprises a second item of equipment that is movably arranged on the first housing part or the second housing part. The second item of equipment can be brought into a position for use and into a fastening position. Staying with the example of the on-board toilet monument, this could be a urinal which when required is folded out, deflected or moved out of a fastening position and subsequently can be used by a person. This could, for example, take place manually or in an automated manner; the latter for example by way of a proximity switch or a control element, individually controlled by a user. This significantly reduces the space required within the monument, because it is not necessary to permanently provide additional comfort functions; at the same time it increases the functional features and thus the feeling of comfort of the individual passenger.

In an embodiment of the monument, the housing is equipped, when taking up the first relative position of the second housing part to the first housing part, in other words in the pushed-together state, to lock the second item of equipment in the fastening position. If the monument is in the pushed-together state, the pivoting radius might otherwise possibly exceed the space available within the monument.

According to a further embodiment, the second item of equipment is a first sanitary fixture with a discharge. The discharge is connected with a discharge line whose ends are movable relative to each other. By displacement of the first item of equipment, this ability to move must be able to be ensured so that in each state of the monument the discharge remains fully functional, which is made possible by a discharge line whose ends can be moved relative to each other. This can be achieved either by rigid conduits that are interconnected in an articulated manner, or by reinforced hose arrangements that are suitable to resist pronounced suction pressures.

In an embodiment of the monument, the discharge line comprises at least one first discharge line segment and a second discharge line segment which by way of a flexible connection, for example an articulation piece, form the discharge line. In this manner, conventional rigid conduits or the like can be used to implement the discharge line, which conduits or the like can also handle greater differentials in suction pressure.

Finally, in an embodiment of the monument, the monument is designed for installation in a passenger cabin of an aircraft. This means, in particular, the use of materials of the lowest possible density, the use of high-strength fiber-reinforced composites, sandwich panels with honeycomb core and the like so that with the lowest possible weight adequate stability of the housing and of all the installations can be achieved.

The monument provides a particular advantage in that space that is normally unused during operation of the vehicle is used as a result of the expanded area of the monument and can be made accessible again in the vehicle for the purpose of entering or leaving. The monument can meet various tasks; it can, for example, be used as an on-board toilet, lavatory, change room or the like.

It should be pointed out that all the movement sequences relating to the second housing part, the locking means, and the first and second item of equipment can be carried out not only manually but also automatically, i.e., electrically, pneumatically, hydraulically or in some other manner.

A use of a monument, as described above, is also provided for a passenger cabin of a vehicle. Furthermore, a vehicle with a passenger cabin is provided with at least one passenger cabin exit and at least one monument. The monument comprises a first housing part with a floor side and a connection side, a second housing part with a floor side and a connection side, and at least one first covering element. The first housing part is connected by its floor side to a floor of the cabin. The housing parts are designed according to the above description. This makes it possible to fasten the second housing part in a first position beside the passenger cabin exit and in a second position in front of the passenger cabin exit.

BRIEF DESCRIPTION OF THE DRAWINGS

Further characteristics, advantages and application options are disclosed in the following description of the exemplary embodiments and of the figures. All the described and/or illustrated characteristics per se and in any combination form the subject of the embodiments, even irrespective of their composition in the individual claims or their interrelationships. Furthermore, identical or similar objects in the figures have the same reference characters, where:

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
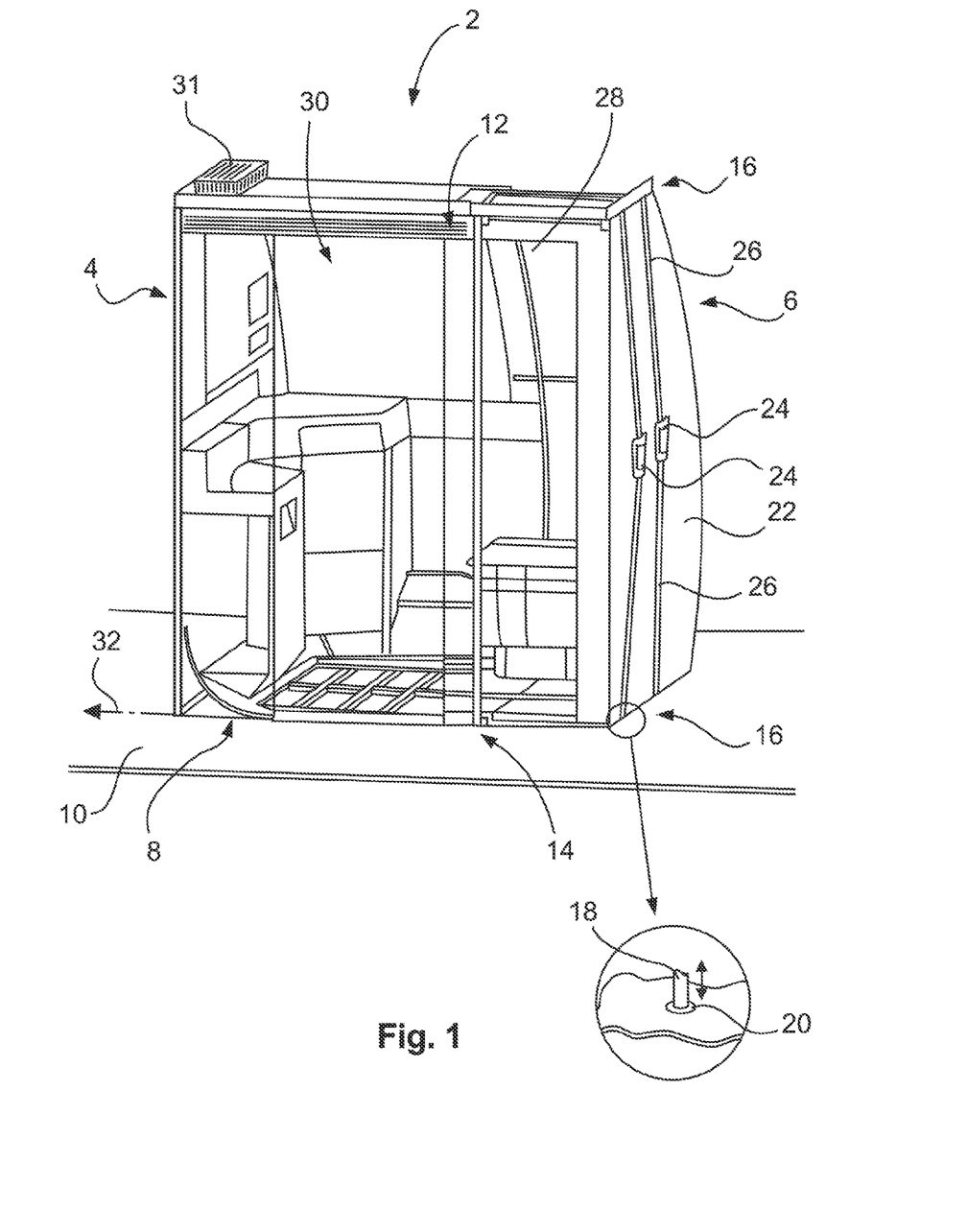
FIG. 1 shows a three-dimensional view of a monument according to an embodiment in a pushed-apart state.

FIG. 1 shows a monument 2 according to an embodiment with a first housing part 4 and a second housing part 6. The first housing part 4 is attached by a floor side 8 to a cabin floor 10. On a connection side 12, the second housing part 6 comprises a cross-section that makes it possible to slide the second housing part 6 into a connection side 14 of the first housing part 4.

The illustration shows that the housing part 4 and the second housing part together form a housing that defines the external dimension of the monument 2. By fully sliding the second housing part 6 into the first housing part 4, which corresponds to a first relative position, the monument 2 according to the invention attains its minimum size. After fully pulling out the second housing part 6 from the first housing part 4, which corresponds to a second relative position, the monument 2 attains its maximum size.

For the purpose of fastening, the second housing part 6 in the first relative position the second housing part 6 comprises locking means 16. These could be designed as latch bodies 18 that can be inserted in respective corresponding latch body retainers 20 of the cabin floor 10 or of a cabin ceiling (not shown). In an exemplary embodiment, a lateral surface 22 of the second housing part 6 comprises two actuating devices 24 that are designed as handgrips, which in each case by way of means of locomotion 26 move the locking means 16. The means of locomotion 26 could be linear in shape, for example designed as push rods. Likewise, it would also be imaginable to push the latch bodies 18 by means of a spring force into the corresponding latch body retainers 20 and to pull them out of the latch body retainers 20 by way of the actuating devices 24 and wire pulleys or cable pulleys connected thereto.

Between the first housing part 4 and the second housing part 6 there is a first covering element 28 that covers a gap between the first housing part 4 and the second housing part 6. As shown in the illustration of FIG. 1 the monument 2 comprises an access opening 30 that extends so as to be parallel to a direction of extension 32 of the monument 2. If the first covering element 28 were rigidly arranged on the second housing part 6, in a pushed-together state of the monument 2 this would close off the access opening 30. The first covering element 28 is, however, designed to be used only if required, so that in a pushed-together state of the monument 2 the first covering element 28 does not impede access through the access opening 30.

Displacement of the second housing part 6 can optionally take place by means of a drive device 31 which, purely as an example, is arranged on the top of the monument 2. The drive device 31 can have any function; it can, for example, implement a movement electrically, pneumatically or hydraulically.

Figure 2:
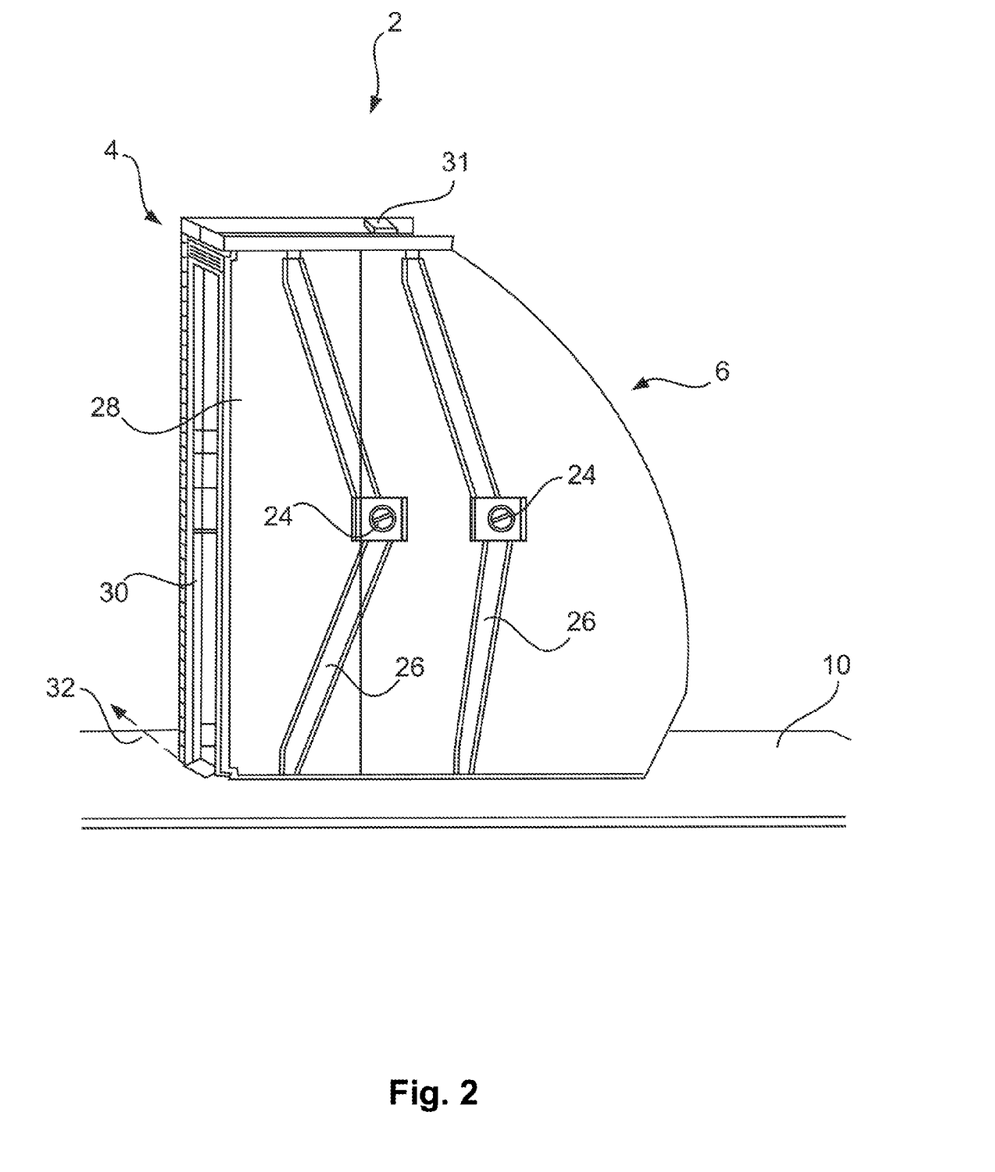
FIG. 2 shows a three-dimensional view, from another perspective, of a monument according to an embodiment in a pushed-in state.

FIG. 2 shows the manner in which the first covering element 28 can be pivotable, as required, as a pivotally mounted door or flap, and can be arranged on the second housing part 6 in order to cover the gap between the first housing part 4 and the second housing part 6 in the second relative position, in other words with the second housing part 6 maximally extended. If the second housing part 6 is in the first relative position to the first housing part 4, the first covering element 28 can be folded to the lateral surface 22 of the second housing part 6. Preferably, to this effect the actuating devices 24 for actuating the locking means 16 are positioned on the surface 22 in such a manner that their function is not impeded as a result of the folded-to covering means 28.

Figure 3:
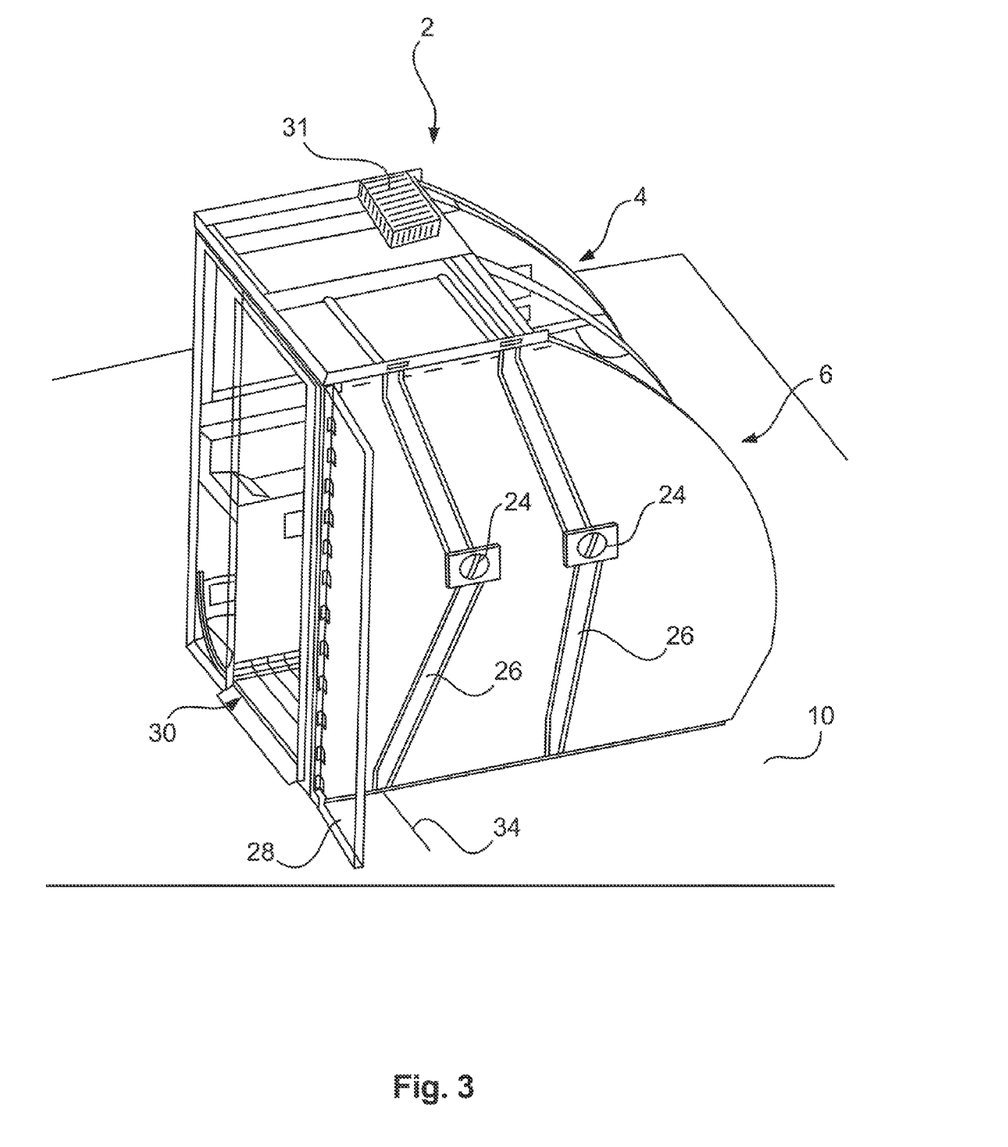
FIG. 3 shows a three-dimensional view, from a further perspective, of a monument according to an embodiment in a pushed-apart state.

FIG. 3 further shows the covering element 28 in a folded-away position that makes it possible to pull the second housing part 6 from the first housing part 4. The cabin floor 10 and/or the first housing part 4 and/or the second housing part 6 could comprise guidance devices 34 suitable to simplify pulling out, which guidance devices 34 could, for example, be designed as a sliding rail or a roller rail or in the manner of a drawer slide between the first housing part 4 and the second housing part 6, which rail or slide takes up the entire load of the second housing part 6. It is particularly preferable for the second housing part 6 to be able to be slightly pulled from the first housing part 4 so that, for example, even a single member of the cabin crew of slight build, for example a flight attendant in an aircraft, is able to slide the second housing part 6.

The selected perspective of FIG. 3 further shows that fold-away covering elements or covering elements that can be deactivated are only required in the housing region with the access opening 30. On the top or on the rear of the monument 2 two ceiling elements arranged on corresponding housing parts 4 or 6 can simply be displaced relative to each other.

Figure 4A:
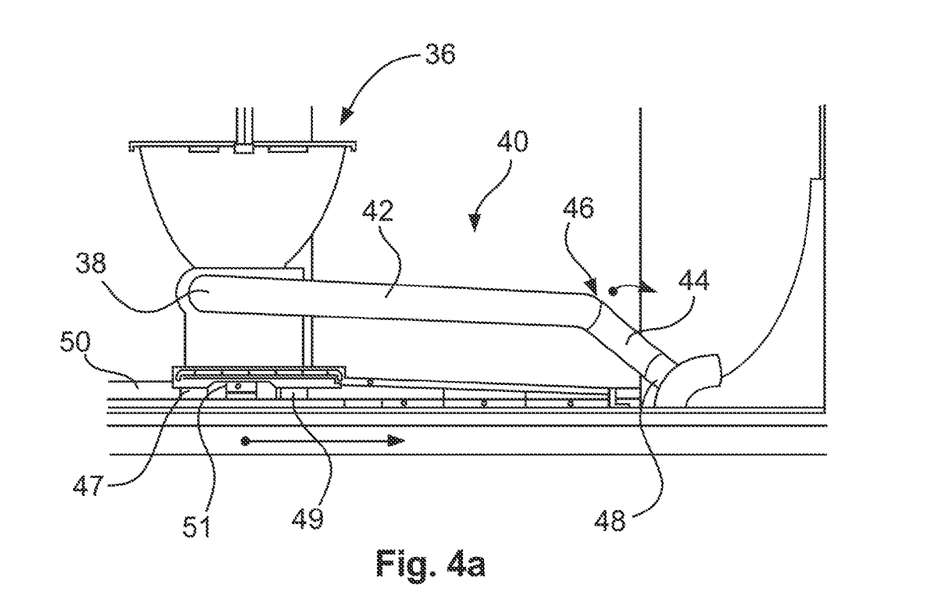
FIG. 4a and FIG. 4b show a discharge for a first sanitary fixture in the monument according to an embodiment.
Figure 4B:
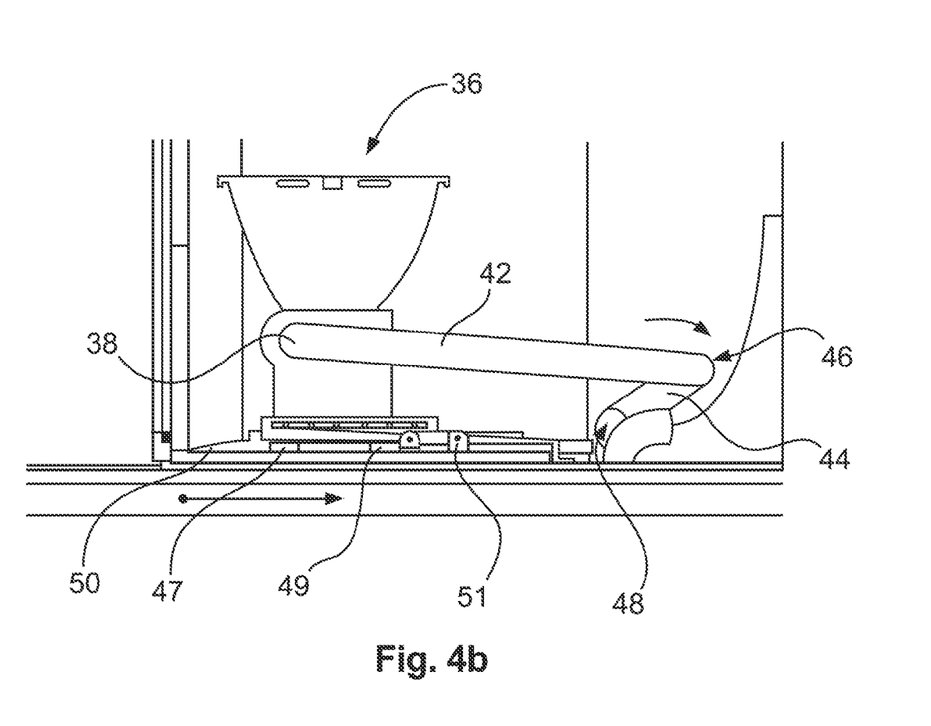

FIG. 4a and FIG. 4b show a first sanitary fixture 36 that could be arranged in the monument 2 and could in an advantageous manner comfortably use the variable space. The first sanitary fixture 36 comprises a discharge 38 that is connected with a discharge line 40. The discharge line 40 comprises a first discharge line segment 42, a second discharge segment 44, and an articulated joint 46 arranged between the two discharge segments 42 and 44. The first discharge segment 42 is, furthermore, arranged in an articulated manner on the discharge 38. The second discharge segment 44 is arranged in an articulated manner on a discharge connection 48 that is situated in a predetermined position within the monument 2. By way of this arrangement with a total of three articulated connections, depending on the design of the discharge line segments 42 and 44, movement of the first sanitary fixture 36 within a wide range is possible while always maintaining the actual discharge function. If the monument 2 is used in an aircraft in which a vacuum is present at the discharge connection 48, the discharge line 40 and thus the discharge line segments 42 and 44 can be made from a rigid material so that the discharge line 40 does not collapse when a vacuum is present.

FIG. 4a and FIG. 4b for the purpose of illustrating the movability of the first sanitary fixture 36 and of the discharge line segment 42 show two different positions of the first sanitary fixture 36. The first sanitary fixture 36 could, for example, when the second housing part 6 has taken up the first relative position vis-à-vis the first housing part 4, be situated within the monument 2, as is shown in FIG. 4a; and when it has taken up the second relative position it could be situated as shown in FIG. 4b. For improved movability of the first sanitary fixture 36 in the monument, preferably a guidance means 50 is arranged in the monument 2, which guidance means 50 could, for example, be designed as a rail on which a sliding element 51 is slidable. This mechanism could be expanded for holding the first sanitary fixture 36 in a first operating position and in a second operating position by means of fastening elements 47 and 49 arranged at predetermined positions. Movement and fastening of the first sanitary fixture 36 can be coupled with the movement of the second housing part 6 so that automatically during enlargement or during reduction of the size of the monument 2 the first sanitary fixture 36 is automatically arranged in its correct operating position. As shown in FIG. 1, FIG. 2, FIG. 3a, and FIG. 3b, this can also be implemented by the drive device 31. As an alternative to this, the first sanitary fixture 36 can also be displaced and fastened by an independent drive device not shown in the figures.

Figure 5A:
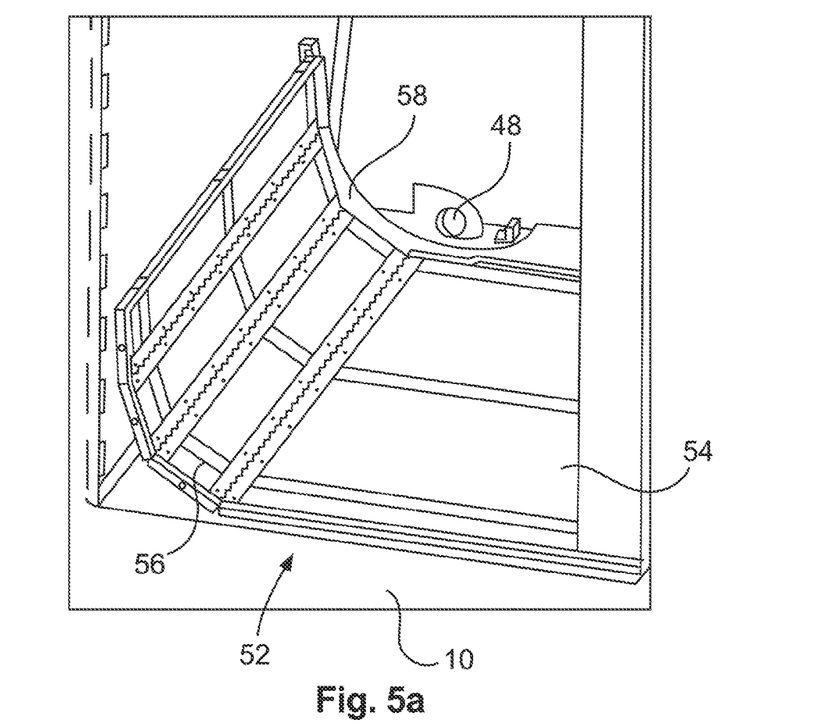
FIG. 5a and FIG. 5b show a three-dimensional view of a flexible floor of the monument according an embodiment.
Figure 5B:
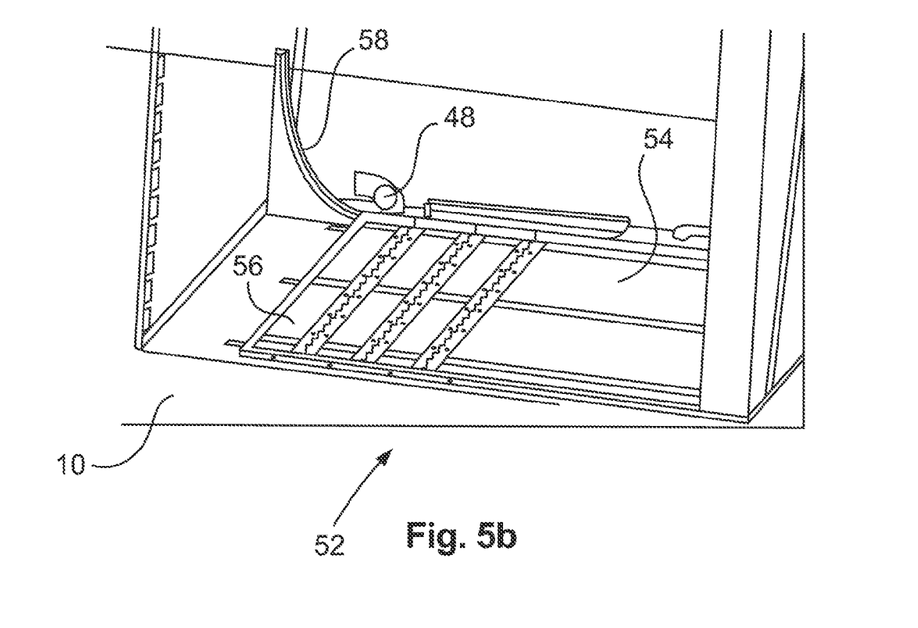

FIG. 5a and FIG. 5b further show a flexible floor 52 that comprises a straight floor section 54 and several lamellar floor sections 56 arranged in an articulated manner on said straight floor section 54. If the second housing part is in the first relative position, the excess portion of the floor 52, i.e., the length of the floor 52 that exceeds the extension of the monument 2, with the use of a receiving means 58 that as an example is designed as a guide rail, is guided to a region of the monument 2, in which region the floor sections 56 that are not used are no longer visible to the user of the monument 2. This could, for example, be underneath a storage compartment or the like.

Such a floor 52 is associated with an advantage in that the complete floor region of the monument 2 comprises a continuous floor covering so that a floor covering of the vehicle, which floor covering is situated underneath the aforesaid, is in no relative position soiled by a user of the monument 2. To the average person skilled in the art it is obvious that other types of floors 52 and receiving means 58 could also be used in the monument. For example, fully elastic floors 52 could be taken up or released again when required by receiving means 58 designed as rollers or cylinders.

Figure 6A:
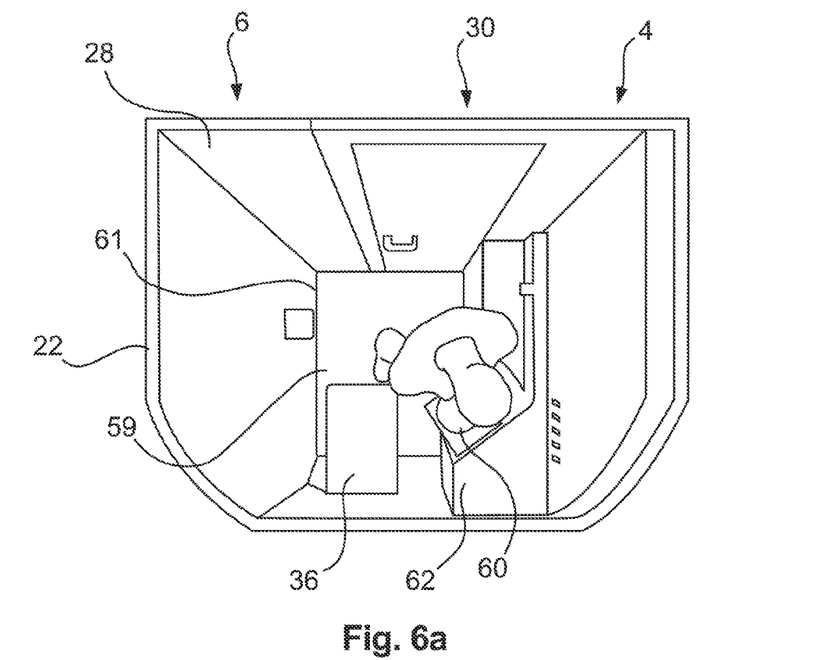
FIG. 6a and FIG. 6b show a top view of the monument according to an embodiment in a pushed-apart state and in a pushed-together state.
Figure 6B:
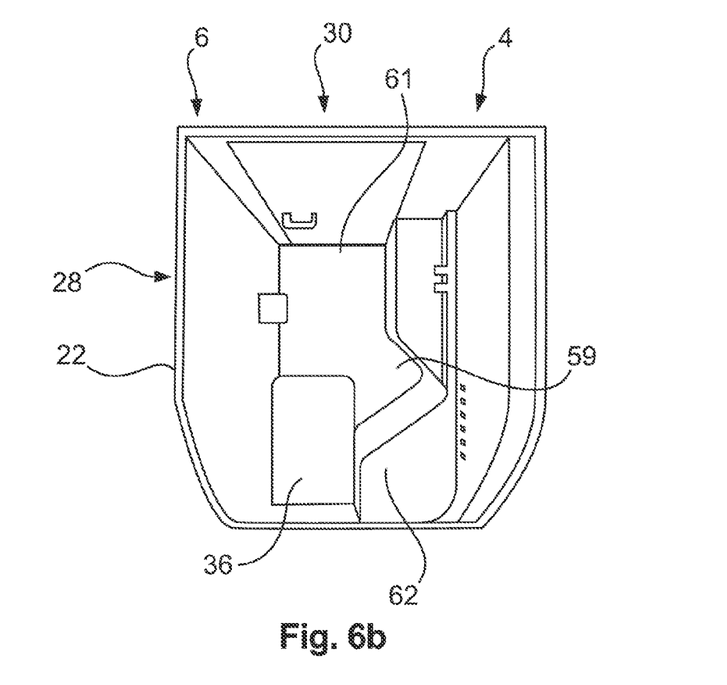

In an exemplary manner in FIG. 6a and FIG. 6b, a monument 2 is shown in a pushed-apart state (FIG. 6a) and in a pushed-in state (FIG. 6b). The monument 2 could, for example, comprise a first sanitary fixture 36 that can be used in any operating mode of the monument 2. In the pushed-together state, the first sanitary fixture 36 is positioned so as to closely rest against an external wall of the monument 2 so that the space taken up by the monument 2 in a pushed-in state is not excessive. During the operational phase of the vehicle and when the monument 2 is in its pulled-out state the first sanitary fixture 36 is, however, somewhat moved away from this exterior wall of the monument 2 so that the use of the first sanitary fixture 36 is facilitated.

Since within the monument in the pushed-out state a free space results, it would be possible within this free space to operate an additional, second, sanitary fixture 60, which is, for example, designed as a urinal. To prevent this second sanitary fixture from being intrusive or objectionable to passengers within the monument, said second sanitary fixture can be arranged so as to be pivotable within a covering device 62. To prevent pivoting-out the second sanitary fixture 60 in the pushed-together state, a fastening device could be arranged in the covering device 62, which fastening device blocks the second sanitary fixture 60 in this state. Pivoting-out the second sanitary fixture can be effected by any desired actuating means, for example by a button or a non-contacting proximity sensor.

This illustration of FIG. 6a and FIG. 6b shows a floor covering 59 that is arranged on the actual flexible floor. Preferably, the floor covering 59 is designed in combination with an edge region 61 of the floor to form a type of floor tray that prevents any discharge of dirt or liquids towards the outside.

Figure 7:
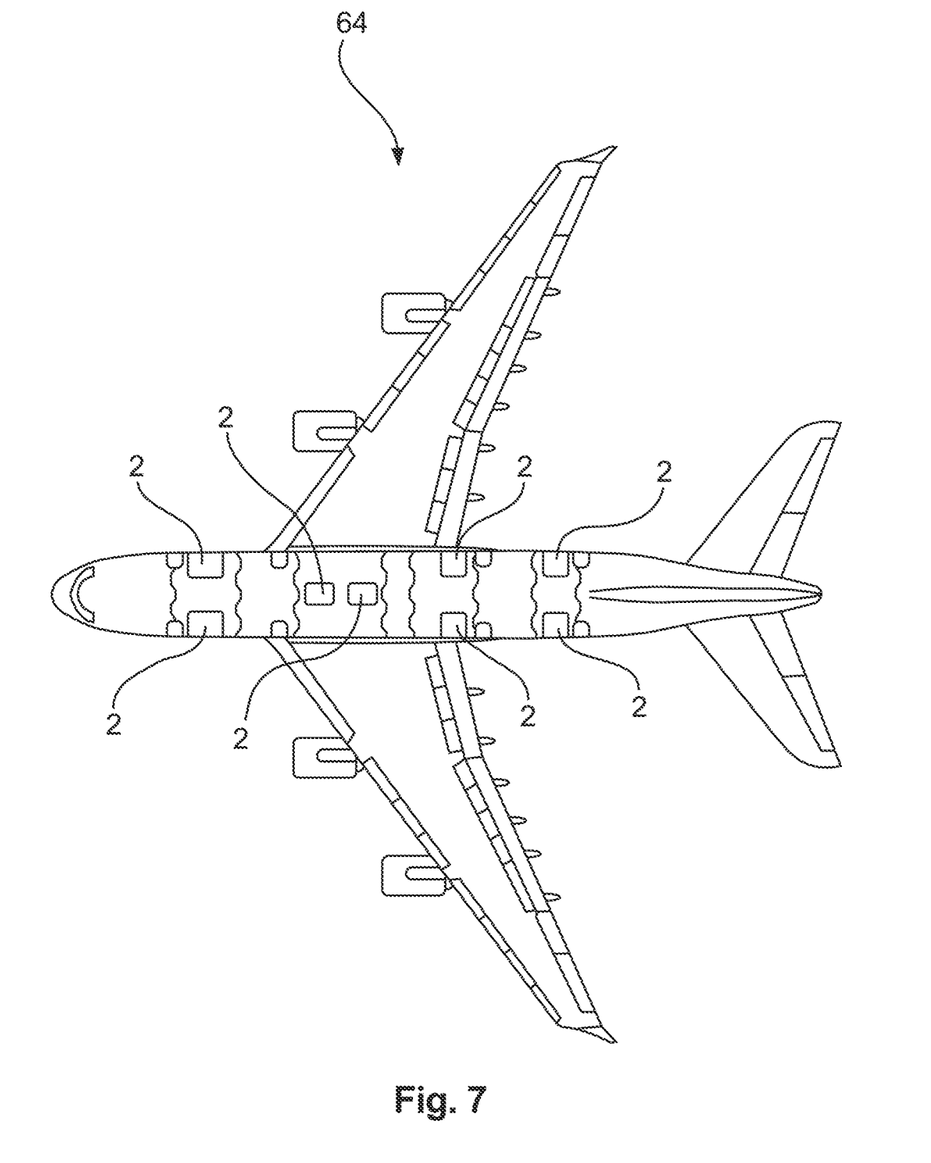
FIG. 7 shows an aircraft with a passenger cabin and at least one monument arranged therein.

FIG. 7 further shows an aircraft 64 with a passenger cabin and several monuments 2 arranged in an exemplary manner therein, which monuments can be arranged both in regions of passenger cabin doors 66 and in regions in the center of the passenger cabin. Thus in flight a maximum of comfort is provided in the monument 2, while when the aircraft is stationed on the ground, adequately fast boarding is possible at all times.

In addition, it should be pointed out that "comprising" does not exclude other elements or steps, and "a" or "an" does not exclude a plural number. Furthermore, it should be pointed out that characteristics or steps that have been described with reference to one of the above exemplary embodiments can also be used in combination with other characteristics or steps of other exemplary embodiments described above. Reference characters in the claims are not to be interpreted as limitations.

What is claimed is:

1. A monument for a cabin of a vehicle, comprising:
   a first housing part with a floor side and a connection side;
   a second housing part with a floor side and a connection side; and
   at least one first covering element;
   wherein the first housing part is equipped to be attached by the floor side to a floor of the cabin,
   wherein for sliding one of the first housing part and the second housing part into the other housing part an outer cross-section of the connection side of one of the first housing part and the second housing part is dimensioned so as to be smaller than an opening cross-section of the connection side of the other housing part, and the first housing part and the second housing part form a housing, the housing including a flexible floor having a width extending in a direction along the outer cross-section of the first housing part and a length that extends between the first housing part and the second housing part and at least one of the first housing part and the second housing part includes a receiving device that stows and releases an excess floor length,
   wherein at least one of the first housing part and the second housing part comprises a lock configured to fasten the second housing part in a first relative position and in a second relative position to the first housing part, and
   wherein the at least one first covering element is arranged on the first housing part or the second housing part for covering a gap between the connection side of the first housing part and of the second housing part in the second relative position.

2. The monument of claim 1, wherein the lock is configured to rigidly interconnect the first housing part and the second housing part.

3. The monument of claim 1, wherein the lock is configured to connect the second housing part with the floor of the cabin.

4. The monument of claim 1, wherein the lock is configured to connect the second housing part with a cabin ceiling.

5. The monument of claim 1, wherein the lock comprises an actuating device configured to activate the lock.

6. The monument of claim 5, wherein the actuating device is a displaceable handgrip that for locking by locomotion moves at least one latch body into at least one corresponding latch body retainer and locks in the respective end position.

7. The monument of claim 1, wherein the at least one first covering element is a wall element that is movably mounted on the first housing part.

8. The monument of claim 1, wherein the at least one first covering element is a wall element that is movably mounted on the second housing part.

9. The monument of claim 1, wherein the flexible floor comprises at least one rigid section and at least one lamellar section.

10. The monument of claim 1, wherein the floor comprises a second flexible floor covering that forms a floor tray with an edge finish of the floor.

11. The monument of claim 1, wherein the receiving device is a guidance device that is configured to guide the excess floor length in vertical direction to an edge region of at least one of the first housing part and of the second housing part.

12. The monument of claim 1, further comprising a first item of equipment that is movably arranged in the housing and fastenable in a first operating position and in a second operating position.

13. The monument of claim 12, wherein the first item of equipment is a first sanitary fixture with a discharge, and wherein the discharge is connected with a discharge line with ends that are movable relative to each other.

14. The monument of claim 13, wherein the discharge line comprises at least one first discharge line segment and a second discharge line segment that are interconnected with an articulated joint.

15. The monument of claim 1, wherein the monument is an on-board toilet monument.

16. The monument of claim 1, further comprising:
a second item of equipment that is movably arranged on the first housing part or on the second housing part,
wherein the second item of equipment is configured to be brought into a position for use and into a fastening position.

17. The monument of claim 16,
wherein the housing is equipped, when taking up the first relative position of the first housing part to the second housing part, to lock the second item of equipment in the fastening position.

18. The monument of claim 1, wherein the vehicle is an aircraft.

19. An aircraft, comprising:
a passenger cabin;
at least one door for the passenger cabin; and
at least one monument, the at least one monument comprising:
a first housing part with a floor side and a connection side;
a second housing part with a floor side and a connection side; and
at least one first covering element,
wherein the first housing part is attached by the floor side to a floor of the passenger cabin,
wherein for sliding one of the first housing part and the second housing part into the other housing part an outer cross-section of the connection side of one of the first housing part and the second housing part is dimensioned so as to be smaller than an opening cross-section of the connection side of the other housing part, and the first housing part and the second housing part form a housing, first housing as part and a length that extends between the first housing part and the second housing part and at least one of the first housing part and the second housing part includes a receiving device that stows and releases an excess floor length,
wherein the second housing part comprises a lock that is configured to fasten the second housing part in a first relative position to the first housing part beside the at least one cabin door and in a second relative position to the first housing part in front of the at least one door, and
wherein the at least one first covering element is arranged on the first housing part or on the second housing part for covering a gap between the connection side of the first housing part and of the second housing part in the second relative position.

* * * * *